United States Patent [19]
Cohen

[11] Patent Number: 5,634,594
[45] Date of Patent: *Jun. 3, 1997

[54] FLOW CONTROL DEVICE PARTICULARLY USEFUL IN DRIP IRRIGATION EMITTERS

[76] Inventor: Amir Cohen, Yuvalim, 20 142, Doar Na Gush Segev, Israel

[*] Notice: The term of this patent shall not extend beyond the expiration date of Pat. No. 5,400,973.

[21] Appl. No.: 465,034

[22] Filed: Jun. 5, 1995

Related U.S. Application Data

[63] Continuation-in-part of Ser. No. 389,479, Feb. 16, 1995, which is a continuation-in-part of Ser. No. 348,852, Nov. 28, 1994, which is a continuation-in-part of Ser. No. 99,509, Jul. 30, 1993, Pat. No. 5,400,973.

[51] Int. Cl.$^6$ ........................................ B05B 15/00
[52] U.S. Cl. .................... 239/542; 239/547; 239/533.13
[58] Field of Search ........................ 239/542, 547, 239/533.1, 533.13, 463, 464; 138/42, 44, 45

[56] References Cited

U.S. PATENT DOCUMENTS

| | | | |
|---|---|---|---|
| 4,210,287 | 7/1980 | Mehoudar | 239/547 |
| 4,343,305 | 8/1982 | Bron | 128/214 |
| 4,413,786 | 11/1983 | Mehoudar | 239/542 |
| 4,428,397 | 1/1984 | Bron | 137/504 |
| 4,796,660 | 1/1989 | Bron | 137/504 |
| 5,137,522 | 8/1992 | Bron | 604/247 |
| 5,183,208 | 2/1993 | Cohen | 239/542 |
| 5,279,462 | 1/1994 | Mehoudar | 239/542 |
| 5,443,212 | 8/1995 | Dinur | 239/542 |

*Primary Examiner*—Andres Kashnikow
*Assistant Examiner*—Lisa Ann Douglas
*Attorney, Agent, or Firm*—Benjamin J. Barish

[57] ABSTRACT

A flow control device particularly useful as a drip irrigation emitter includes a housing having a housing including a plurality of inlet openings defining a plurality of filtering inlet passageways to communicate with a pressurized fluid, an outlet opening, and a connecting passageway connecting the inlet openings to the outlet opening, and a pressure-deformable elastomeric membrane having a edge overlying the inlet openings and deformable to change the effective cross-sectional areas thereof in a dynamic manner in response to the pressure of the pressurized fluid.

20 Claims, 5 Drawing Sheets

FIG. 1
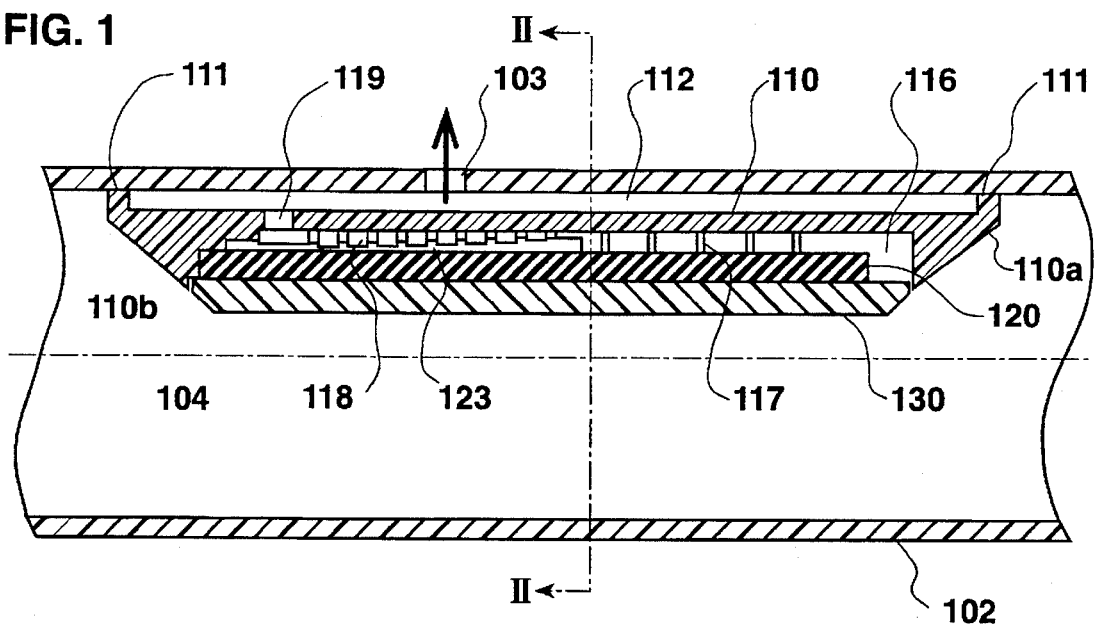
FIG. 2
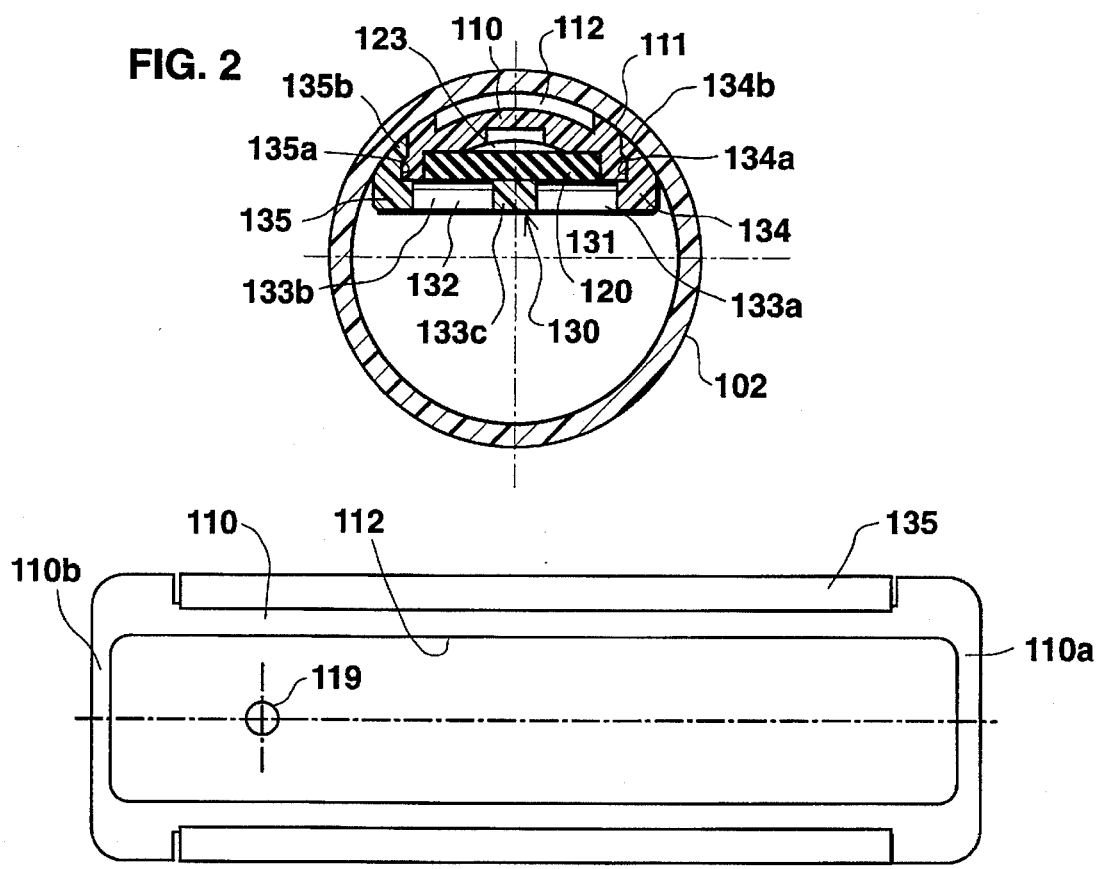
FIG. 3

FLOW CONTROL DEVICE PARTICULARLY USEFUL IN DRIP IRRIGATION EMITTERS

RELATED APPLICATIONS

The present application is a continuation-in-part of my application Ser. No. 08/389,479 filed Feb. 16, 1995, still pending which in turn is a continuation-in-part of my application Ser. No. 08/348,852, filed Nov. 28, 1994, still pending which in turn is a continuation-in-part of my application Ser. No. 08/099,509, filed Jul. 30, 1993, now U.S. Pat. No. 5,400,973.

FIELD AND BACKGROUND OF THE INVENTION

The present invention relates to flow control devices and particularly to such devices as used in drip irrigation emitters.

The invention is particularly applicable to the tube-type drip irrigation emitter, which includes a tube for conducting water therethrough and formed with a plurality of discharge openings spaced along the length of the tube, and a plurality of flow control units bonded to the inner face of the tube at spaced intervals along the length of the tube. Such flow control units are applied to the tube at the time the tube is extruded and while the tube is still soft so that the flow control unit is firmly bonded to the inner face of the tube. Each flow control unit includes an inlet communicating with the interior of the tube, an outlet communicating with one of the discharge openings, and a flow control passageway connecting the inlet to the outlet. In the pressure-compensated type emitter, the flow control passageway includes an elastomeric membrane which controls the flow through the passageway in response to the differential pressure on the opposite faces of the membrane, thereby maintaining a substantially uniform discharge rate despite variations in the inlet pressure.

My patent application Ser. No. 08/389,479 discloses a drip irrigation emitter of this type including a housing constructed of a body member and a cover securing between them the pressure-compensating membrane. In the described embodiment, the cover is formed with a plurality of inlet openings in the form of slits defining filtering passageways through which the water is inletted into the housing.

OBJECTS AND BRIEF SUMMARY OF THE INVENTION

An object of the present invention is to provide a flow control device also including a housing having a plurality of inlet openings defining filtering passageways, but of a construction in which there is produced a dynamic filtering action at the inlet openings, such that the effective cross-sectional areas of the inlet openings are automatically changed in response to pressure, being decreased during the usual periods of operation to produce the above filtering action, but being increased during starting and ending periods of operation to permit automatic self-flushing of these passageways. Another object of the invention is to provide a flow control unit having the above features and particularly useful for drip irrigation emitters.

According to one aspect of the present invention, there is provided a flow control device, comprising: a housing including a plurality of inlet openings defining a plurality of filtering inlet passageways to communicate with a pressurized fluid, an outlet opening, and a connecting passageway connecting the plurality of inlet openings to the outlet opening; and a pressure-deformable elastomeric member having at least one edge overlying at least some of the inlet openings and deformable to change the effective cross-sectional areas thereof in a dynamic manner in response to the pressure of the pressurized fluid.

In the described preferred embodiments, the housing includes a body member and a cover attached thereto, with the elastomeric member in between. In two described embodiments, the inlet openings are formed in the cover, and the elastomeric member cooperates with such inlet openings so as to decrease their effective cross-sectional areas during operative periods, and to increase their effective cross-sectional areas during starting and ending periods thereby producing a self-flushing action during such periods.

According to a further described embodiment, the inlet openings are in the body member, and the elastomeric member is in the form of a membrane having an edge which overlies such inlet openings so that, upon encountering clogging particles, the membrane increases the effective cross-sectional areas of the inlet openings to self-flush clogging particles.

According to another aspect of the present invention, there is provided a flow control device, comprising a housing including a plurality of inlet openings to communicate with a pressurized fluid during operative periods when the fluid is under an operative (i.e., the normal operating) pressure, starting periods when the fluid pressure builds up to the operative pressure, and ending periods when the fluid pressure drops down from the operative pressure. The housing further includes an outlet opening, a connecting passageway connecting the inlet openings to the outlet opening, and a pressure-deformable member located with respect to the inlet openings, and deformable in response to the fluid pressure, to decrease the effective cross-sectional areas of the inlet opening during the operative periods such that the inlet openings filter out solid particles from the fluid entering the housing, and to increase the effective cross-sectional areas of the inlet openings during the starting and ending periods such that solid particles are flushed through the housing inlet openings and through the outlet.

According to further features in the described preferred embodiment, the pressure-deformable member is an elastomeric membrane: and the housing includes a body member and a cover attached thereto with the membrane in between.

As will be described more fully below, such a flow control device produces a dynamic filtering action at the inlet openings; that is, during normal operation, the relatively high operational pressure deforms the membrane to cause the inlet openings to be of relatively small cross-sectional areas so as to prevent the entry of solid particles; but during the starting and ending periods, the low pressure returns the membrane to its initial condition whereas it enlarges the cross-sectional areas of the inlet openings so as to flush solid particles through the housing inlets and out through its outlet, thereby producing a self-flushing action during these periods.

When the device is used as a flow control unit in a drip irrigation emitter of the pressure-compensated type, the same membrane be used to provide the pressure compensation may also be used to produce the above-described dynamic filtering action. Many of such emitters also produce a self-flushing action through their control passageways during starting and ending periods; thus, when the present invention is used in such emitters, the solid particles flushed through the filtering inlet passageways encounter relatively large passageways all the way to the discharge openings in the tube.

Several embodiments of the invention are described below for purposes of example. In one described embodiment, the filtering inlet openings are formed in a main section of the cover; in a second described embodiment, they are formed in side sections of the cover; and in a third described embodiment, they are formed in an end section of the body member.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a longitudinal sectional view illustrating a portion of a drip irrigation emitter constructed in accordance with the present invention;

FIG. 2 is a transverse sectional view along line II—II of FIG. 1;

FIG. 3 is a plan view of the flow control unit as viewed from the face thereof facing the inner surface of the tube;

DESCRIPTION OF PREFERRED EMBODIMENTS

Figure 4:
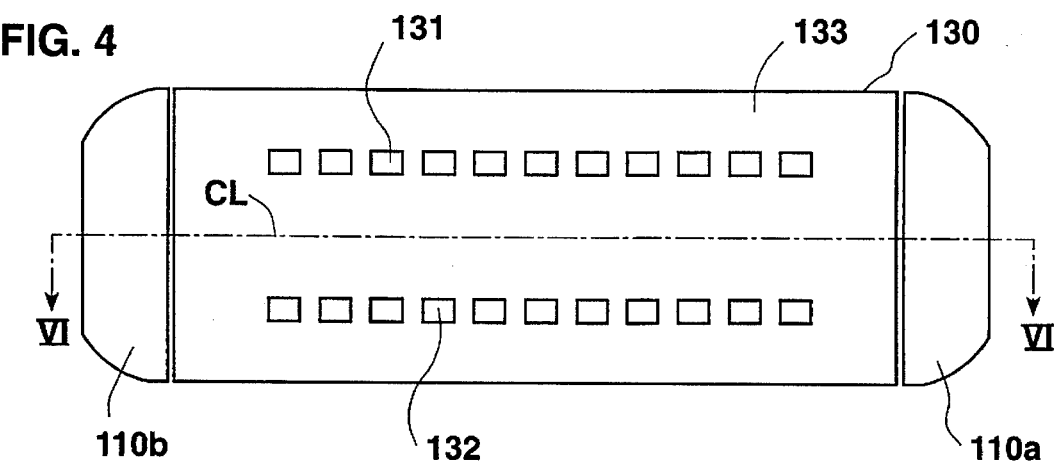
FIG. 4 is a plan view of the flow control unit viewed from the interior of the tube.
Figure 5:
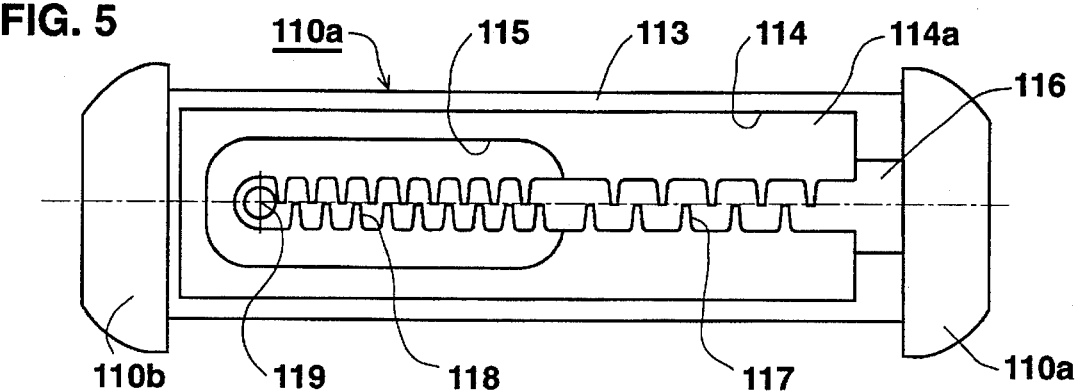
FIG. 5 is a view of the flow control unit of FIG. 1 as viewed from the interior of the tube but with the cover and membrane removed.

The drip irrigation emitter illustrated in FIGS. 1–7 is of a similar construction as that described in my U.S. patent application Ser. No. 08/389,479 still pending. It comprises a tube 102 for conducting water therethrough and formed with a plurality of discharge openings 103 spaced along the length of the tube. Such an irrigation tube also includes a plurality of flow control units, generally designated 104, bonded to the inner face of the tube at spaced intervals along its length. Each flow control unit extends for substantially less than one-half the circumference of tube 102, and includes an inlet communicating with the interior of the tube, an outlet communicating with one of the discharge openings 103, and a flow control passageway connecting the inlet to the outlet. For simplification purposes, FIG. 1 illustrates only a portion of the tube having a single discharge outlet 103, and a single flow control unit 104 for the respective discharge outlet.

Each flow control unit 104 includes three members: a body, generally designated 110; a deformable elastomeric membrane, generally designated 120; and a cover, generally designated 130, fixed to the body member and covering the inner face of the membrane.

Body member 110 is formed with an outer face 111 conforming to the curvature of the inner face of tube 102 and bonded to it by welding. The outer face 111 of body member 110 is also formed with a cavity 112 defining, with the inner face of the tube 102, an outlet chamber communicating with the respective discharge opening 103 in the tube 102.

The inner face of body member 110 (i.e., the face exposed to the interior of tube 102) is formed with a flat outer rim 113 (FIG. 5) of generally rectangular configuration for seating the cover 130. A large rectangular cavity 114 is thus defined by rim 113. Cavity 114 includes a flat bottom surface 114a which serves as a seat for the membrane 120. A second cavity 115 is formed within and at one end of cavity 114.

The inner face of body member 110 is further formed with a recess 116 in one end of the rectangular rim 113, a first plurality of baffles 117 within cavity 114, a second plurality of baffles 118 within cavity 115, and an outlet opening 119 through the body member.

Figure 6:
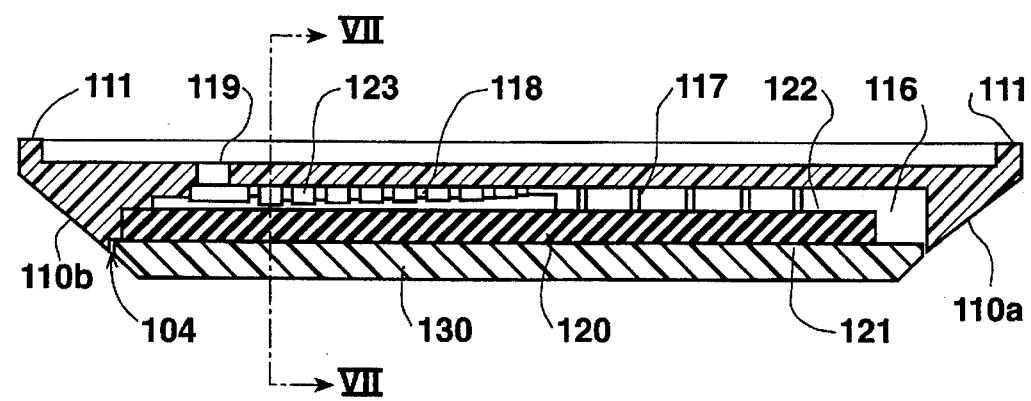
FIG. 6 is a longitudinal sectional view along line VI—VI of FIG. 4.

Membrane 120 is seated on the flat surface 114a of cavity 114 to overlie baffles 117, baffles 118, and the outlet opening 119, but not the recess 116 in the rim, as shown in FIGS. 1 and 6. Cover 130 engages the inner surface 121 of membrane 120 and retains its outer surface 122 against the flat surface 114a of the body member.

Baffles 117 formed in cavity 114 are all of the same height, and their edges are engaged by the outer surface 122 of membrane 120 when assembled into the flow control unit. Therefore, the labyrinth defined by baffles 117 and the outer surface 122 of membrane 120 is of fixed dimensions.

However, baffles 118 formed in cavity 115 are of decreasing height from the outlet opening 119 towards the fixed-height baffles 117 and define a pressure-compensated flow control passageway. That is, in the absence of pressure applied to membrane 120 by the water within the tube, the membrane is spaced from the edges of baffles 118 such that the outer face of the membrane defines with the baffles a plurality of clearances 123 of increasing height from the outlet opening 119 towards the fixed-height baffles 117. During operation, these clearances successively close with an increase in pressure applied to the inner face of the membrane.

As shown particularly in FIG. 4, cover 130 is formed with two rows of openings or slits 131, 132 in the cover main section 133 on opposite sides of its center line CL. The outer face of cover section 133 (i.e., the one facing membrane 120) is formed with two stepped recesses 133a, 133b (FIGS. 7, 7a) extending for the length of the cover and communicating with openings 131 and 132, respectively. The center portion 133c of the cover extending along the center line is unrecessed. The outer section of each stepped recess 133a, 133b is perforated by the opening 131, 132, whereas the inner section of each recess bordering the center unrecessed surface 133 is of deeper depth than the outer sections.

Membrane 120 is of rectangular configuration, corresponding to the outer dimensions of the flat surface 114a circumscribed by rim 113 in body member 110, except that the membrane, as noted earlier, is slightly shorter than the rim 113 so that it does not overlie the recess 116 deformed in one end (the right end) of the rim. Thus, when the cover 130 is assembled to the body member 110, with the membrane 120 in between, openings 131, 132 through the cover, and their respective recesses 133a, 133b in the outer face of the cover facing the membrane, expose the inner surface 121 of membrane 120 to the inlet pressure, and also serve as inlets via recess 116 to the labyrinth defined by baffles 117. Membrane 120 is retained by cover 130 between flat surface 114a of the body member and the central unrecessed surface 133c of the cover.

As seen particularly in FIG. 2, cover 130 further includes two longitudinal side sections 134, 135. These sections are formed on their inner surfaces with longitudinally-extending grooves 134a, 135a, adapted to receive longitudinally-extending ribs in the longitudinal sides of the body member 110 for temporarily retaining the body member assembled to the cover, with the membrane 120 between the two, until the assembly is bonded to the inner face of the tube 102. The longitudinal side sections 134, 135 of cover 130 are further formed with curved surfaces 134b, 135b, conforming to the curvature of tube 102, to engage and become welded to the tube, together with the curved surfaces 111 of body member 110, during the extrusion of the tube.

The outer surfaces of the two transverse end sections 110a, 110b at the opposite ends of body member 110 are slanted to minimize interference with the flow of water through the tube.

The illustrated device operates as follows:

During no-pressure or low-pressure conditions (e.g. start-up or ending periods), the central non-recessed surface 133c of cover 130 spaces membrane 120 above the inlet openings 131, 132 (FIG. 7) thereby providing relatively large cross-sectional areas for these inlet openings. However, when the unit is subjected to pressure (during operational irrigation periods), membrane 120 deforms to the bowed shape illustrated in FIG. 7a. This lowers the longitudinal edges of the membrane towards the inlet openings 131, 132, thereby reducing the effective cross-sectional areas of these inlet openings.

The illustrated device operates as follows:

Accordingly during start-up, as soon as pressure is applied to the water, the water flows through inlet openings 131, 132 to the inner face of membrane 120. The water also flows via recess 116 through the pressure-reducing labyrinth defined by baffles 117, and then through the pressure-compensated labyrinth defined by baffles 118, exiting via outlet opening 119, outlet chamber 112, and discharge openings 103.

Figure 7:
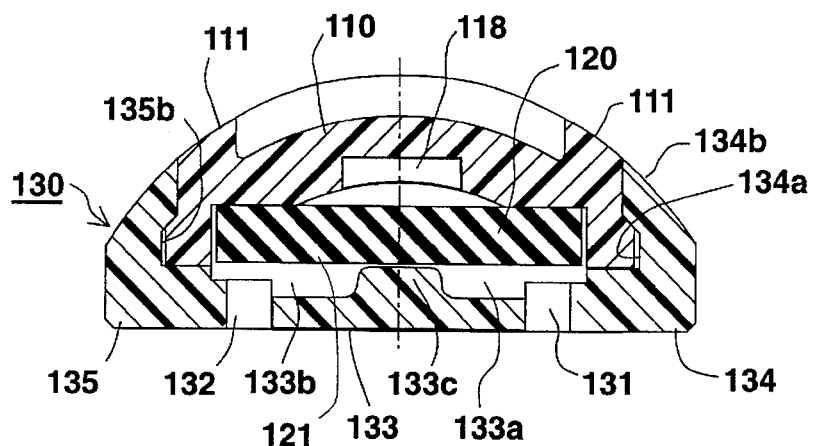
FIG. 7 is a transverse sectional view along line VII—VII of FIG. 6 under low-pressure conditions, i.e. during starting-up or ending of operational periods.

During this starting-up condition, the relatively low inlet pressure applied to the inner face of membrane 120 produces inlet openings 131, 132 of large effective cross-sectional areas as illustrated in FIG. 7, and also relatively large passageways through the labyrinths of baffles 117 and 118, so that dirt particles tend to be flushed out through the unit.

Figure 7A:
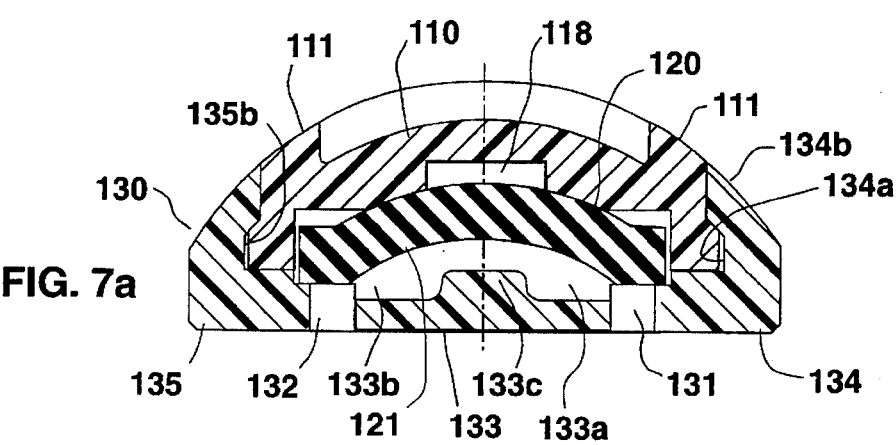
FIG. 7a is a view similar to that of FIG. 7, but during the high-pressure (i.e. operational) periods.

As the inlet pressure increases to the operational pressure, membrane 120 is deformed to the bowed condition illustrated in FIG. 7a, such that the longitudinal edges of the membrane tend to reduce the effective cross-sectional areas of the inlet openings 131, 132, thereby filtering out solid particles from the water entering the unit. The water entering the unit passes via recess 116 first through the pressure-reducing labyrinth of baffles 117, and then through the pressure-compensating labyrinths of baffles 118 such that the water is outletted via outlet opening 119, outlet chamber 112, and discharge port 103 at a relatively uniform rate despite variations in the water pressure. When the water pressure is again lowered or turned off at the end of an irrigation period, membrane 120 again returns to its initial condition as illustrated in FIG. 7, producing inlet openings of relatively large cross-sectional areas, so that dirt particles are again flushed out via the inlet openings 131, 132.

It will thus be seen that the membrane 120 not only cooperates with the two groups of baffles 117 and 118 to reduce and regulate the outlet flow, but also cooperates with the inlet openings 131, 132 to produce a dynamic filtering action at these openings, producing inlet passages of relatively small cross-sectional areas during the irrigation operations of the device, and passages of relatively large cross-sectional areas during starting-up and ending of irrigation operations for automatically self-flushing the unit.

Figure 8:
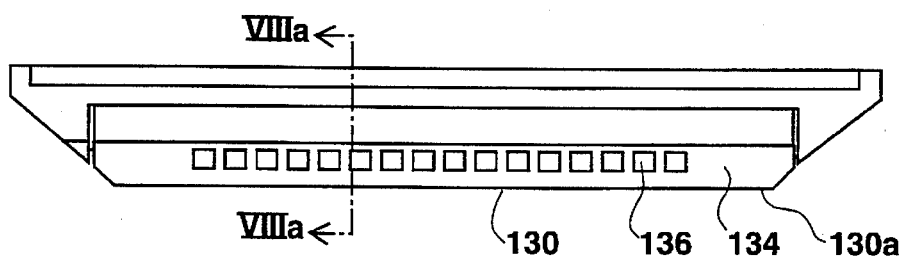
FIG. 8 is a side elevational view of a second embodiment of the invention during low-pressure (starting-up and ending) conditions.
Figure 8A:
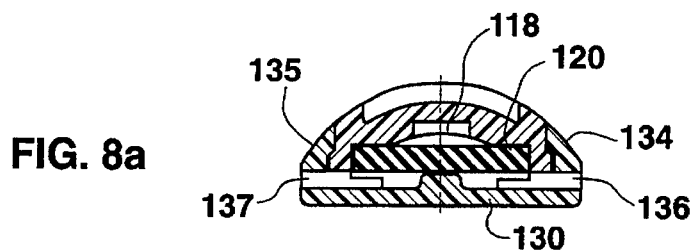
FIGS. 8a and 9a are sectional views along lines VIIIa—VIIIa and IXa—IXa of FIGS. 8 and 9, respectively.
Figure 9:
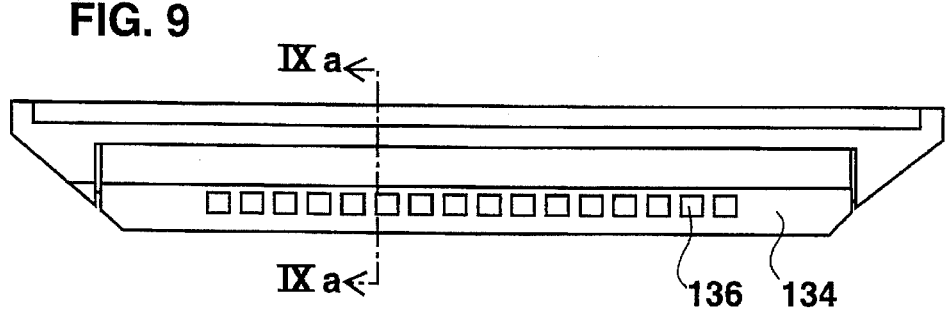
FIG. 9 is a view similar to that of FIG. 8 but during high-pressure (operational) conditions.
Figure 9A:
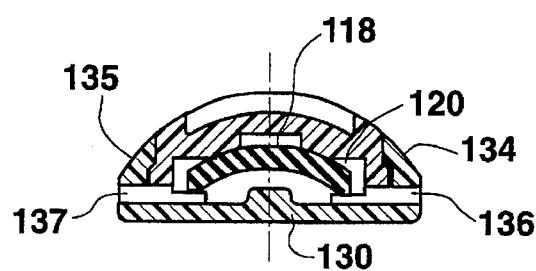
Figure 10:
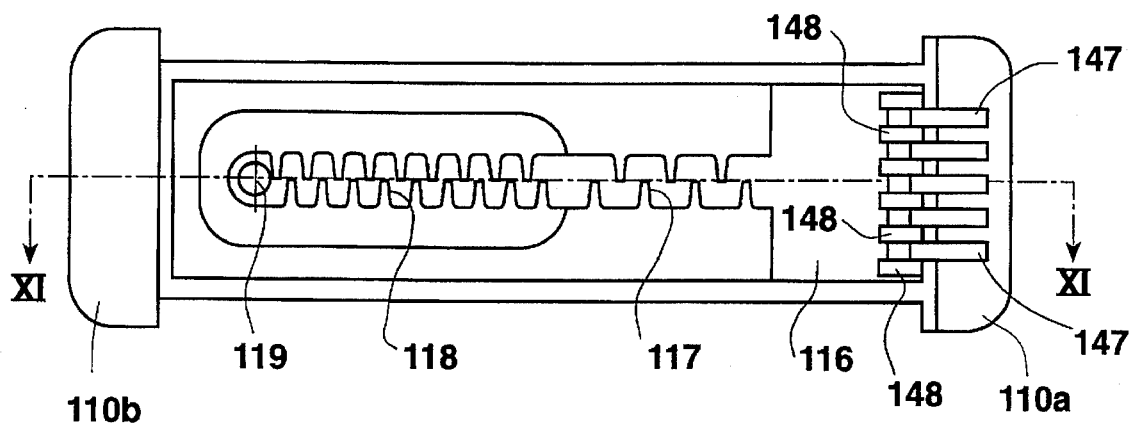
FIGS. 10, 11 and 12 are views corresponding to FIGS. 5, 6 and 7, respectively, but illustrating a third embodiment of the invention.
Figure 11:
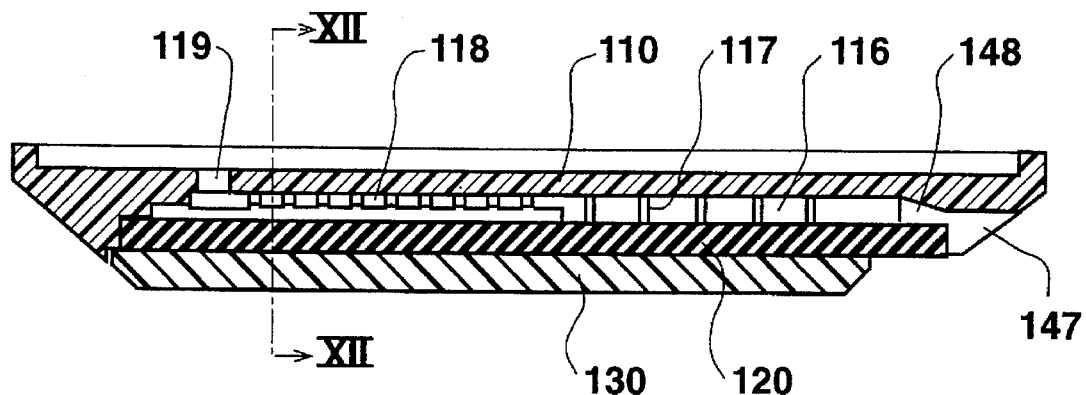
Figure 12:
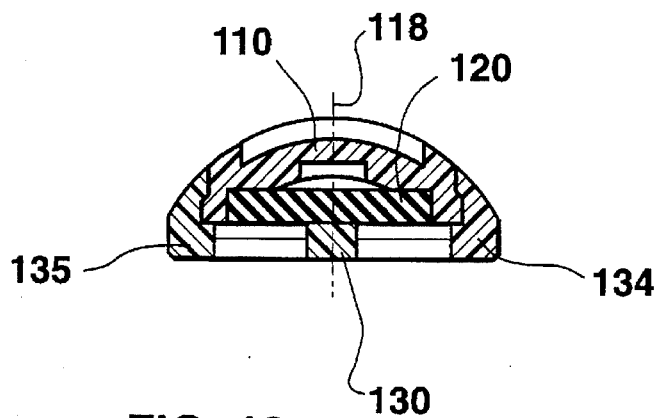

FIGS. 8 and 9 illustrate a construction similar to that of FIGS. 1–7, except the inlet openings, instead of being formed in the cover main section 133, are formed in the cover end sections as shown at 136 and 137 in FIGS. 8, 8a, and 9, 9a. In this construction, the longitudinal edges of the membrane 120 cooperate with the inlet openings 136, 137 in substantially the same manner to produce the dynamic filtering action as described above with respect to FIGS. 7 and 7a. Thus, during the low-pressure conditions as shown in FIGS. 8 and 8a, the longitudinal edges of membrane 120 are spaced away from the inlet openings 136, 137, thereby producing relatively large cross-sectional passageways during starting and ending periods of irrigation for self-flushing the unit; whereas during the high-pressure conditions prevalent during irrigation operations, the membrane 120 is deformed to the bowed shape illustrated in FIG. 9a such that the opposite longitudinal edges of the membrane partially cover the inlet openings 136, 137, as shown in FIG. 9, to reduce the effective cross-sectional area of these openings.

Figure 13:
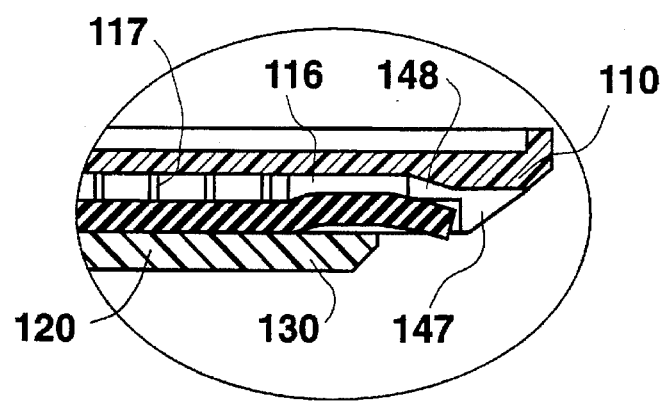
FIG. 13 is a fragmentary view corresponding to FIG. 11 but illustrating the condition of the membrane during high-pressure (operational) conditions.

FIGS. 10–13 illustrate another similar construction, except here the inlet openings, shown at 147, are formed in one end section 110a of the body member 110, namely the end section adjacent to the inlet recess 116 at the inlet end of the two labyrinths. In this case, the transverse edge of the membrane 120 overlies inlet openings 147 and is supported by ribs 148 on opposite sides of these inlet openings. Thus, when a clogging particle enters an inlet opening 147, the flow into the recess 116 leading to the labyrinth 117 is reduced, so that the differential pressure on the opposite sides of the edge of the membrane causes the membrane to curve upwardly, as shown in FIG. 13, thereby increasing the cross-sectional area of opening 147 to permit the clogging particle to be flushed through that opening and through the device.

While the invention has been described with respect to several preferred embodiments, it will be appreciated that these are set forth merely for purposes of example, and that many other variations, modifications and applications of the invention may be made.

I claim:

1. A flow control device, comprising:
   a housing including a plurality of inlet openings defining a plurality of filtering inlet passageways to communicate with a pressurized fluid, an outlet opening, and a connecting passageway connecting said plurality of inlet openings to said outlet opening;
   and a pressure-deformable elastomeric member having at least one edge overlying at least some of said plurality of inlet openings and deformable to change the effective cross-sectional areas thereof in a dynamic manner in response to the pressure of the pressurized fluid.

2. The device according to claim 1, wherein said housing includes a body member and a cover attached thereto, with said elastomeric membrane in between.

3. The device according to claim 2, wherein said plurality of inlet openings are formed in said cover.

4. The device according to claim 2, wherein said plurality of inlet openings are formed in at least one longitudinal side section of the cover and cooperate with a longitudinal edge of the elastomeric member.

5. The device according to claim 2, wherein said plurality of inlet openings are formed in at least one end section of the body member such that the respective transverse edge of the elastomeric member deforms upon the presence of a clogging particle to automatically flush the clogging particle.

6. The device according to claim 1, wherein the device is a flow-control unit for an irrigation emitter, and said pressure-deformable member is an elastomeric membrane which also controls the flow of the fluid through said connecting passageway.

7. The device according to claim 6, wherein said connecting passageway includes a first group of baffles cooperating with one section of said elastomeric membrane to define a pressure-reducing section of the connecting passageway, and a second group of baffles, between said first group and said outlet opening, cooperating with a second section of said membrane to define a pressure-compensated section of the connecting passageway.

8. The flow control unit according to claim 6, wherein said inlet openings are formed in a main section of the cover adjacent to an edge of the cover and cooperate with a respective edge of the elastomeric membrane.

9. A flow control device, comprising:

a housing including a plurality of inlet openings defining a plurality of filtering inlet passageways to communicate with a pressurized fluid during operative periods when the fluid is under an operative pressure, starting periods when the fluid pressure builds up to the operative pressure, and ending periods when the fluid pressure drops down from the operative pressure;

said housing including an outlet opening, and a connecting passageway connecting said plurality of inlet openings to said outlet opening;

and a pressure-deformable member located with respect to said plurality of inlet openings, and deformable in response to the fluid pressure, to decrease the effective cross-sectional areas of the inlet openings during said operative periods such that the inlet openings filter out solid particles from the fluid entering the housing, and to increase the effective cross-sectional areas of the inlet openings during said starting and ending periods such that solid particles are flushed through the housing inlet openings and through said outlet.

10. The device according to claim 9, wherein said pressure-deformable member is an elastomeric membrane deformable in response to pressure.

11. The device according to claim 10, wherein said housing includes a body member and a cover attached thereto with said membrane in between.

12. The device according to claim 11, wherein said plurality of inlet openings are formed in said cover.

13. The device according to claim 12, wherein said plurality of inlet openings are formed in at least one longitudinal side section of the cover and cooperate with a longitudinal edge of the elastomeric membrane.

14. The device according to claim 13, wherein said plurality of cover includes two of said longitudinal side sections at its opposite sides, both of said side sections being formed with said inlet openings and cooperate with the respective longitudinal edges of the elastomeric membrane.

15. The device according to claim 14, wherein said elastomeric membrane is relatively flat and is supported by said cover such that the longitudinal edges of the elastomeric membrane overlie said inlet openings but are spaced therefrom under low-pressure conditions, and are movable towards said inlet openings under high-pressure conditions to reduce their effective cross-sectional areas by the bowing of the elastomeric membrane.

16. The flow control unit according to claim 15, wherein said housing includes a body member and a cover attached thereto, said membrane being clamped between said body member and cover.

17. The device according to claim 12, wherein said plurality of inlet openings are formed in a main section of the cover adjacent to an edge of the cover and cooperate with a respective edge of the elastomeric membrane.

18. The device according to claim 17, wherein said plurality of inlet openings are formed in longitudinal edges of the cover and cooperate with respective longitudinal edges of the elastomeric membrane.

19. The device according to claim 18, wherein said plurality of elastomeric membrane is relatively flat and is supported by said cover such that the longitudinal edges of the elastomeric membrane overlie said inlet openings but are spaced therefrom under low pressure conditions, and are movable towards said inlet openings under high-pressure conditions to reduce the effective cross-sectional area thereof by the bowing of the elastomeric membrane.

20. A flow control unit for an irrigation emitter, comprising:

a housing including a plurality of inlet openings defining a plurality of filtering inlet passageways to communicate with a pressurized fluid during operative periods when the fluid is under an operative pressure, starting periods when the fluid pressure builds up to the operative pressure, and ending periods when the fluid pressure drops down from the operative pressure;

said housing including an outlet opening, a control passageway connecting said plurality of inlet openings to said outlet opening, and an elastomeric membrane defining at least a part of said control passageway;

said membrane being located with respect to said inlet openings, and deformable in response to the fluid pressure, to decrease the effective cross-sectional areas of the inlet openings during said operative periods such that the inlet openings filter out solid particles from the fluid entering the housing, and to increase the effective cross-sectional areas of the inlet openings during said starting and ending periods such that solid particles are flushed through the housing inlet openings and through said outlet.

* * * * *